United States Patent [19]

Adams

[11] 4,274,383

[45] Jun. 23, 1981

[54] FUEL VAPORIZER

[75] Inventor: Jerry W. Adams, Wellington, Tex.

[73] Assignee: Vapor Matic Corporation, Wellington, Tex.

[21] Appl. No.: 67,879

[22] Filed: Aug. 20, 1979

[51] Int. Cl.³ ............................................. F02M 31/00
[52] U.S. Cl. ................................... 123/523; 123/557; 261/144
[58] Field of Search ............ 123/557, 523; 26/119 R, 26/119 A, 144, 145

[56] References Cited

U.S. PATENT DOCUMENTS

| 2,461,411 | 2/1949 | Cummings | 123/522 |
| 2,650,582 | 9/1953 | Green | 261/144 |
| 2,748,758 | 6/1956 | Fairbanks | 123/557 |
| 3,447,511 | 6/1969 | Beard | 123/557 |
| 3,955,546 | 2/1975 | Lee | 123/557 |
| 4,003,969 | 1/1977 | Robinson | 123/557 |

Primary Examiner—Ronald H. Lazarus
Attorney, Agent, or Firm—Wendell Coffee

[57] ABSTRACT

Hot water is transmitted from an automobile's cooling system to a fuel vaporizer wherein it is used to heat gasoline to a vapor state. Air is added to the vapor by a fan, then forced to the carburetor. The flow of vapor into the carburetor is controlled by adjusting a vapor pickup within the carburetor's air cleaner. In this manner, the fuel-air vapor is more efficiently burned in the engine and better mileage is achieved.

11 Claims, 10 Drawing Figures

FUEL VAPORIZER

CROSS REFERENCE TO RELATED APPLICATIONS

None. However, applicant filed Disclosure Document No. 079,501 on Apr. 2, 1979, which document concerns this application; therefore, by separate paper, it is respectfully requested that the document be retained.

BACKGROUND OF THE INVENTION (1) Field of the Invention

This invention relates to vaporizing liquid fuels and mixing the vapor with air for spark ignition in an internal combustion engine.

(2) Description of the Prior Art

Automobiles are powered almost exclusively by internal combustion engines. With the advent of the energy shortage, people became concerned with the number of miles per gallon that their cars could get. Many cars on the road today have large engines which can produce much more power than is necessary to go the speed limit. These large engines use a great deal of gas. Many methods have attempted to increase the gas mileage of these large engines. These attempts to increase the performance of large engines have met with only varying degrees of success. One area for improvement is better vaporization of the liquid fuel. Different methods for controlling the amount of vapor have been tried. Many inventors have attempted to control the vapor flow by controlling the amount of fuel which is vaporized. This method is usually unsatisfactory as it is very difficult to regulate the rate of vaporization as opposed to the rate of introduction of the vapor into the carburetor.

Before filing this application, applicant caused a search of the prior art to be made at the U.S. Patent and Trademark Office. That search disclosed the following patents:

GRONKWIST—U.S. Pat. No. 1,625,997
MENGELKAMP—U.S. Pat. No. 2,821,843
AUTHEMENT—U.S. Pat. No. 3,963,013
PIERCE—U.S. Pat. No. 4,074,666
TOTTEN—U.S. Pat. No. 4,106,457
QUINN—U.S. Pat. No. 4,146,002

QUINN discloses a fuel preheater using hot water from the car's cooling system to vaporize fuel which is mixed with air and forwarded to the carburetor.

TOTTEN discloses a fuel vaporizer for vaporizing fuel using hot water and having a valve for adjusting the amount of fuel sent into the vaporizer.

It appears that the other patents listed are of general interest only. These prior patents show that the vaporization of gas and mixing it with air before it reaches the carburetor increases the gas mileage. However, one of the most perplexing problems has been the regulation of the flow of the vapor into the carburetor. Another problem in the art has been the maintenance of a steady heat in the vapor mixing compartment.

SUMMARY OF THE INVENTION (1) New and Different Function

I have intended a way to improve the gas mileage which may be achieved with internal combustion engines. My invention does not increase the power of the engine, in fact, it is known that preheating the fuel-air vapor before it enters the engine has a tendency to reduce the total output of the engine. In view of the fact that automobiles on the road today have engines which generate far more power than is necessary for present speed limits, the increase in efficiency greatly outweighs the loss of power. I have found that great results are achieved when the introduction of the fuel vapor can be regulated.

My system vaporizes fuel at a rate greater than is necessary to be introduced into the carburetor. The amount of suction which is exerted on the fuel vapor line is varied by moving a vapor pickup either up or down in an air pickup tube of the carburetor. In this manner I am able to accurately control the amount of vapor introduced into the carburetor and thereby increase the total efficiency of the car's engine.

Thus it may be seen that the function of the total combination far exceeds the sum of the functions of the float valves, air filters, etc.

(2) Objects of this Invention

An object of this invention is to vaporize fuel for an internal combustion engine.

Another object is to vaporize fuel and thoroughly mix the vapor with air.

Further objects are to facilitate adjusting the flow of the vapor-air mixture into the carburetor.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENT

Figure 1:
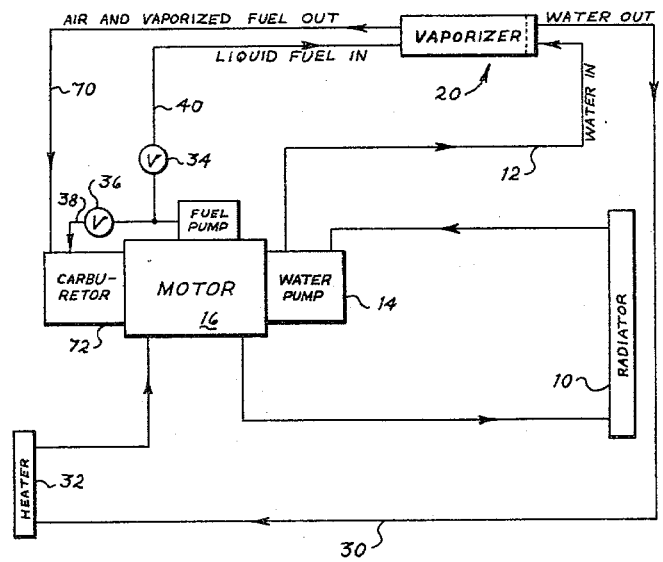
FIG. 1 is a schematic representation showing the organization of the fuel vaporizer with an automobile engine.
Figure 2:
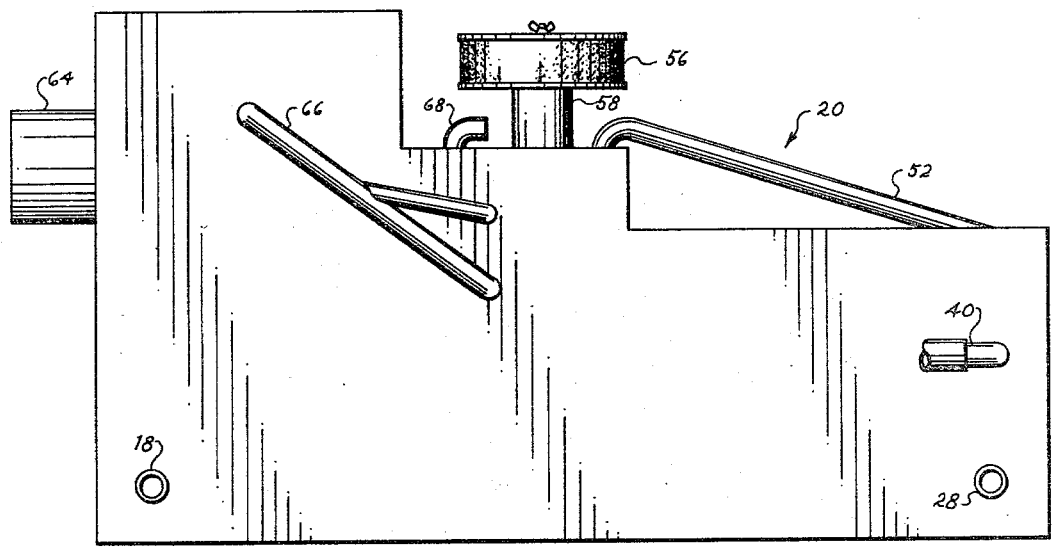
FIG. 2 is a side elevational view of a vaporizer according to my invention.
Figure 4:
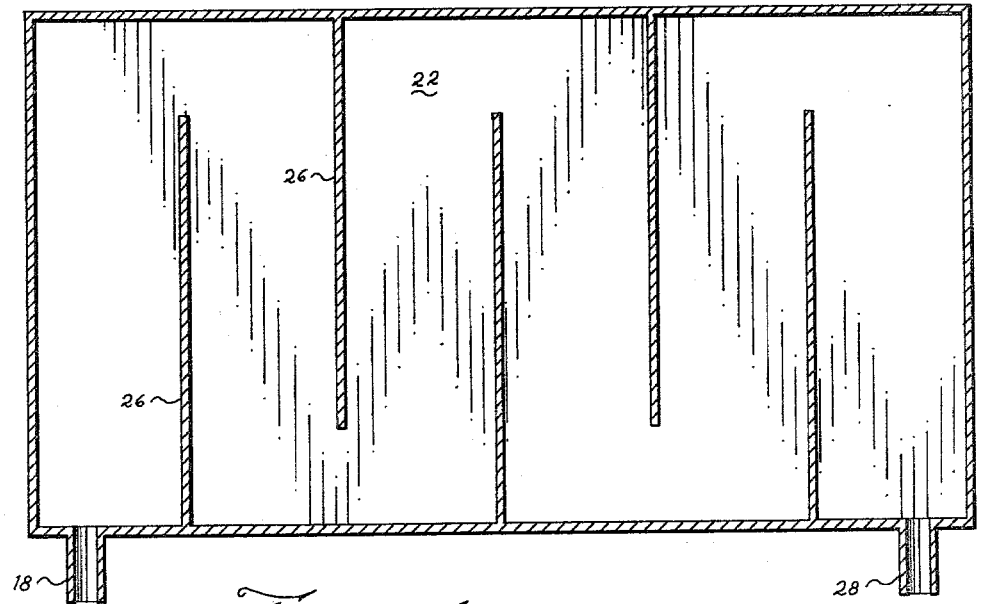
FIG. 4 is a sectional view of the vaporizer taken substantially along line 4—4 of FIG. 3.

Referring more particularly to FIGS. 1 and 4 of the drawing, hot water is transmitted from the cooling system on engine or motor 16 (which includes radiator 10, water pump 14, and heater 32) through hot water line 12 to hot water inlet 18 of vaporizer 20. The hot water is introduced into hot water compartment 22 of the vaporizer. The top of hot water compartment 22 is formed by hot plate 24. Baffles 26 are located within the hot water compartment. The hot water is forced through the hot water compartment 22 among baffles 26 and out through return water outlet 28 back to the engine via water return line 30.

Figure 3:
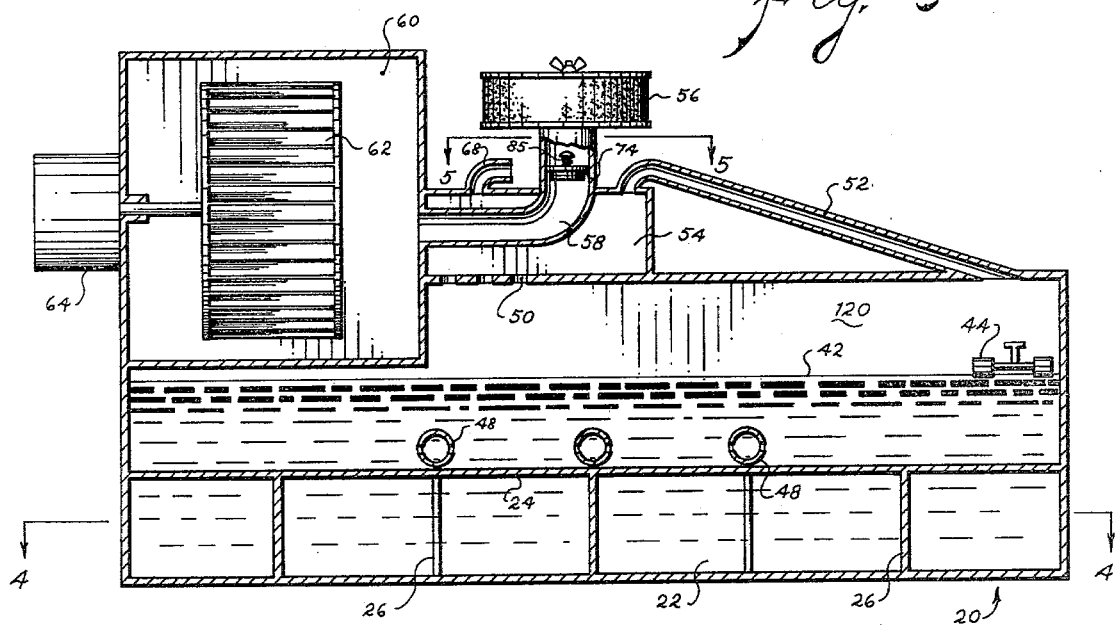
FIG. 3 is a longitudinal section of the vaporizer generally along line 3—3 of FIG. 7.

After the car's engine is warm, solenoid valve 34 may be electrically opened and solenoid valve 36 closed thereby diverting the liquid fuel from fuel line 38 to vaporizer inlet line 40 into fuel pool 42 in vaporizer compartment 120. The valve 34 may be eliminated and the inlet line 40 always be open. The level of the fuel in the pool 42 is controlled by fuel float 44 (FIG. 3).

The fuel inlet line 40 terminates at the valve 44.

Figure 7:
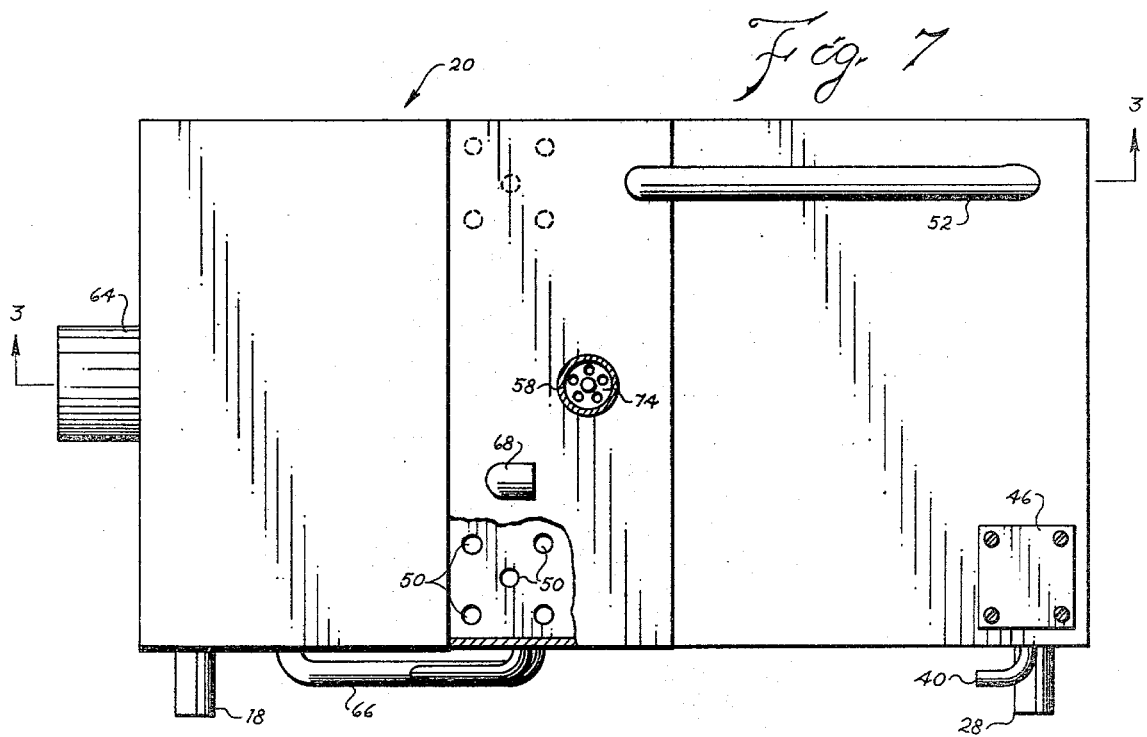
FIG. 7 is a top plan view of the vaporizer.

When the fuel level drops, the valve is opened and more fuel enters the pool 42. Problems sometimes arise in the fuel float valve 44 so inspection plate 46, shown in FIG. 7, is located immediately above the float. By simply removing four screws, one may gain access to the valve 44. Also, three surge retarders 48 are located in the pool 42 on hot plate 24. The surge retarders are pieces of pipe with a plurality of holes spaced therein. These surge retarders 48 maintain the temperature stability and level of the fuel within the pool as well as helping to prevent unwanted sloshing of the fuel. The surge retarders 48 also help retain heat in the pool making the fuel vaporize more readily.

Heat radiates from the hot plate 24 heating some of the fuel in the pool to a vapor state. The fuel vapor then rises from vapor compartment 120 either through holes 50 or through vapor conduit 52 into vapor mixture compartment 54. Outside air enters the vaporizer 20 through an air inlet system. As air enters the inlet system it passes through vaporizer air filter 56 and proceeds through air inlet 58 into fan cage 60. Fan 62 is rotated by fan motor 64. Air from the fan cage is channelled through bifurcated air conduit 66 either into the vapor compartment 120 or into vapor mixture compartment 54. The fan 62 fully ventilates the vapor-air mixture. The vapor-air mixture is transmitted through vapor outlet 68 through vapor line 70 to the carburetor 72.

Figure 5:
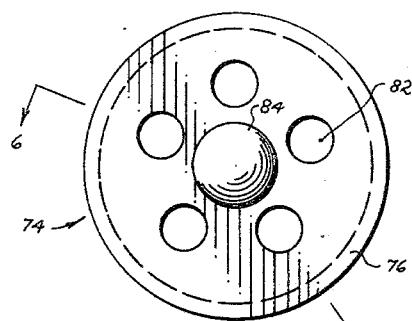
FIG. 5 is a top plan view of the backfire check valve.
Figure 6:
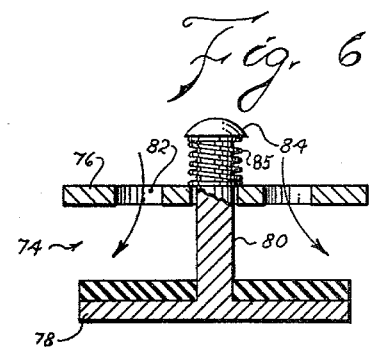
FIG. 6 is a sectional view of the check valve taken substantially along line 6—6 of FIG. 5.

Check valve 74 is located below vaporizer air filter 56 in the air conduit 58. The check valve, shown in FIGS. 5 and 6, has two discs, upper disc 76 and lower disc 78. Lower disc 78 is suspended by piston 80 below the upper disc. The lower disc has a diameter less than the diameter of air conduit 58 while the upper disc 76 has a diameter equal to the diameter of the air conduit 58. Upper disc has five check valve holes 82 arranged around the termination 84 of the piston. In the operating, down position, air passes through holes 82 and around the perimeter of lower disc 78 into the fan cage 60. In the case of a backfire, the lower disc 78 is forced up against the upper discs 76 effectively closing the air supply into and out of the air conduit 66 from the fan 62. Spring 85 holds the lower disc 78 up in the closed position when there is no air flow as seen by the arrows in FIG. 6. This prevents the flow of vapors through the filter 56 when the engine is stopped.

Carburetor air filter 86 is fitted for vapor pickup 88. Vapor line 70 terminates in vapor pickup 88 and it is through this pickup that the air-fuel vapor is introduced into the carburetor 72. The vapor pickup is an "L" shaped tube which extends down through the air filter top 90 and at right angles into air pickup tube 92. The diameter of the vapor pickup 88 is about 1" (2.54 cm) and its distal end 94 is cut diagonally at 45°. An adjusting ear 96 is attached to the vapor pickup 88 at the bend in the "L." Adjusting rod 98 extends from the top of vacuum chamber 100 through air filter top 90 and through adjusting ear 96. The upper end of the adjusting rod 98 is threaded and the lower end is attached as by welding to the top of the vacuum chamber 100. Air is sucked into the carburetor 72 through air pickup tube 92. The air pickup tube 92 is tubular in shape and extends inward in the vacuum chamber toward the carburetor 72. The diameter of the air pickup 92 is about twice the diameter of the vapor pickup 88. The air pickup 92 has an opening end 102 and terminating end 104. Vapor pickup 88 enters the air pickup 92 at a right angle from the top, midway between the opening end and the terminating end. The diagonal cut at the distal end 94 opens toward the carburetor, i.e., down stream.

Flap 95 is pivoted by pin 97 in front of the opening end 102 of the air pickup tube 92. Wire or cable 99 extends from the flap 95. It may be seen that the flap 95 does not entirely cover the opening 102, so that always there is an air passage through it. However, flap 95 can greatly cut down the size of the opening. Those with ordinary skill in the art will understand that when the flap 35 blocks most of the opening 102 of the tube 92 that a richer fuel-air mixture will be introduced to the engine, i.e. that most of the gases entering the engine will be introduced from the vapor pickup 88. However, if the flap 95 is entirely removed from the opening 102 that a leaner fuel-air mixture will be introduced inasmuch as more air will come from within the air filter 86. The control wire 99 may be operated manually or by automatic means.

Figure 8:
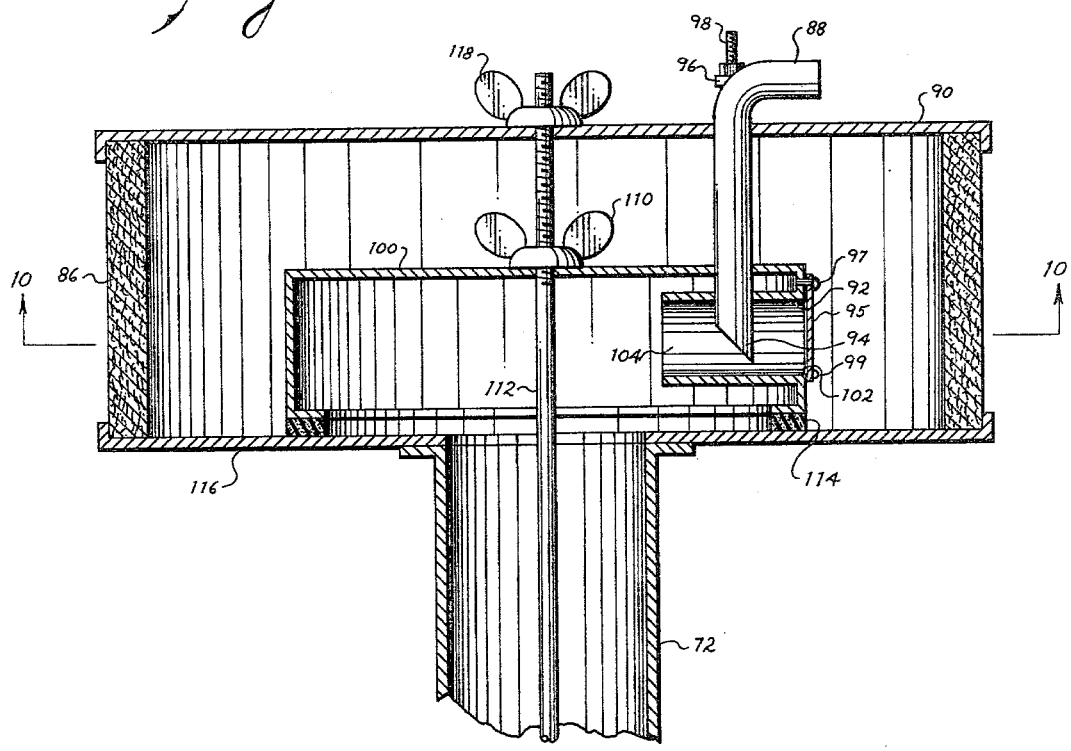
FIG. 8 is a sectional view of an air filter on the engine carburetor fitted with a fuel-air introduction unit according to my invention taken substantially on line 8—8 of FIG. 9.
Figure 9:
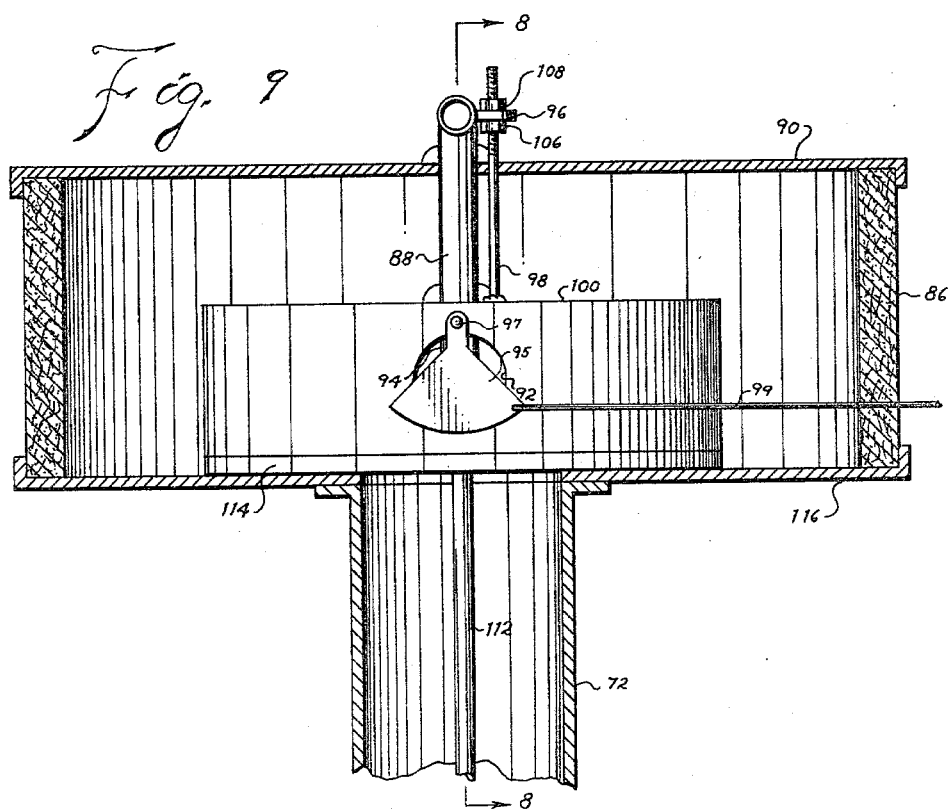
FIG. 9 is a front elevational view of the fuel-air introduction unit with the air filter shown in section.
Figure 10:
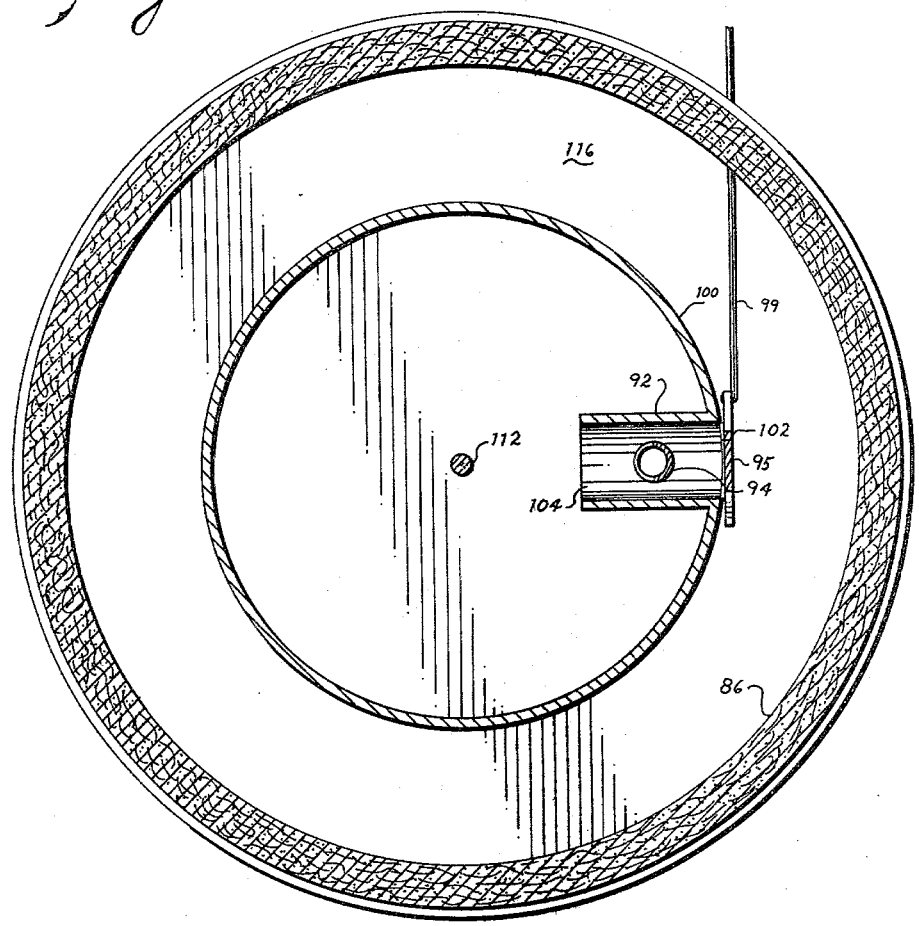
FIG. 10 is a sectional view of the fuel-air introduction unit taken substantially on line 10—10 of FIG. 8.

The amount that vapor pickup 88 extends down into the air pickup 92 may be adjusted by moving nuts 106 and 108. Adjusting nut 106 is located below adjusting ear 96 and may be raised or lowered on the threads of adjusting rod 98. Lock nut 108 locks the ear into position when it is tightened down on adjusting nut 106 and adjusting ear 96. By raising or lowering the vapor pickup 88, the amount of vapor which is sucked into the carburetor may be regulated. As the vapor pickup 88 is lowered further into the air pickup, the suction from the carburetor is greater. This greater suction draws more of the air-fuel mixture from the vaporizer into the carburetor. By raising nut 106 on the threads of adjusting rod 98 and tightening nut 108 down over the adjusting ear 96, vapor pickup 88 is raised and the suction is less making the mixture introduced into the carburetor leaner. In this manner, the percentage of the air-fuel mixture introduced into the carburetor may be controlled and varied. While one type of air filter is shown in FIGS. 8 and 9, it is understood that this invention is applicable to all air filters commonly used on automobiles.

FIG. 1 also shows an alternative fuel supply to the carburetor. When the engine is cold a very rich air-fuel mixture is desired and so fuel may be sent directly to the carburetor without being vaporized. Under this circumstance, fuel goes from the fuel pump through the fuel line 38 to the carburetor. Whether fuel travels directly to the carburetor or through the vaporizer is controlled by solenoid valves 34 and 36. Solenoid valve 36 is in fuel line 38 while solenoid valve 34 is in vaporizer line 40. When solenoid 38 is open, solenoid valve 34 is closed and vice versa.

The vacuum chamber 100 is held in place by thumb nut 110 upon carburetor rod 112. The chamber is sealed by sponge rubber gasket 114 to the bottom 116 of the filter. The filter is held firmly on the carburetor by thumb nut 118 upon the carburetor rod 112.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawings, the following catalog of elements is provided:

| | |
|---|---|
| 10 radiator | 70 vapor line |
| 12 hot water line | 72 carburetor |
| 14 water pump | 74 check valve |
| 16 motor | 76 upper disc |
| 18 hot water inlet | 78 lower disc |
| 20 vaporizer | 80 piston |
| 22 hot water compartment | 82 check valve hole |
| 24 hot plate | 84 piston termination |
| 26 baffles | 85 spring |
| 28 return water outlet | 86 air filter, carburetor |
| 30 water return line | 88 vapor pickup |
| 32 heater | 90 air filter top |
| 34 valve, vapor | 92 air pickup tube |
| 36 valve, liquid | 94 vapor pickup distal |
| 38 fuel line | 95 flap |
| 40 vaporizer inlet line | 96 adjusting ear |
| 42 pool | 97 pin |
| 44 fuel float valve | 98 adjusting rod |
| 46 inspection plate | 99 cable |
| 48 surge retarders | 100 vacuum chamber |
| 50 holes | 102 air pickup opening end |
| 52 vapor conduit | 104 air pickup terminating end |
| 54 vapor mixture compartment | 106 adjusting nut |
| 56 vaporizer air filter | 108 lock nut |
| 58 air inlet | 110 thumb nut |
| 60 fan cage | 112 rod, carburetor |
| 62 fan | 114 gasket |
| 64 fan motor | 116 bottom |
| 66 air conduit | 118 thumb nut |
| 68 vapor outlet | 120 vapor compartment |

I claim as my invention:
1. A fuel vaporizer comprising:
  a. a hot water compartment having
    (i) a plurality of baffles located therein,
    (ii) a hot water inlet,
    (iii) a return water outlet, and
    (iv) the top of said hot water compartment being
    (v) a hot plate,
  b. an air inlet system having
    (i) a vaporizer air filter,
    (ii) an air inlet connecting the filter to
    (iii) a fan within
    (iv) a fan cage,
    (v) said fan rotatable by
    (vi) a fan motor connected thereto,
  c. a vapor compartment having
    (i) said hot plate forming the bottom thereof,
    (ii) a vaporizer liquid fuel inlet line terminating in
    (iii) a fuel float valve for maintaining a liquid fuel pool in the vapor compartment,
    (iv) an air conduit leg from the fan cage,
    (v) a vapor conduit and holes in the top of the vapor compartment connecting the vapor compartment with
  d. a vapor-air mixture compartment having
    (i) another air conduit leg from said fan cage,
    (ii) a vapor-air outlet connected to
  e. a vapor line which extends to an engine carburetor.

2. The invention as defined in claim 1 further comprising
  f. a check valve located between the vaporizer air filter and the carburetor,
  g. said check valve having
    (i) an upper disc having
    (ii) check valve holes there through,
    (iii) a lower disc attached to
    (iv) a piston running through a central hole in the upper disc.

3. The invention as defined in claim 1 further comprising
  f. a vacuum chamber on an engine carburetor,
  g. a vapor pickup on the end of the vapor-air line,
  h. an adjusting rod attached to the vacuum chamber,
  j. an adjusting ear attached to the vapor pickup,
  k. an adjusting ear surrounding the adjusting rod,
  m. an adjusting nut below the adjusting ear,
  n. a locking nut located above the adjusting ear, and
  o. an air pickup tube entering the vacuum chamber
  p. the vapor pickup terminating in the air pickup tube.

4. The invention as defined in claim 1 further comprising
  f. said vapor compartment having surge retarders therein to prevent the liquid fuel pool from sloshing back and forth.

5. The invention as defined in claim 1 further comprising
  f. the exterior of said vapor compartment having an inspection plate proximate the float valve.

6. The invention as defined in claim 2 further comprising:
  h. A spring biasing the lower disc upward to a closed position.

7. The invention as defined in claim 3 further comprising:
  q. a flap pivoted in front of the air pickup tube, and
  r. a control cable attached to the flap.

8. A fuel mixing device for an internal combustion engine having
  a. a carburetor with an inlet and
  b. an air filter on the carburetor; wherein the improvement comprises:
  c. a vacuum chamber within the air filter connected to the inlet of the carburetor,
  d. an air pickup tube forming an inlet to the vacuum chamber,
  e. a vapor pickup in the form of a tube inserted at right angles into the air pickup tube,
  f. an adjusting rod attached to the vacuum chamber parallel to the vapor pickup,
  g. an ear on the vapor pickup around the adjusting rod, and h. an adjusting nut on the rod whereby the distance the vapor pickup is inserted into the air pickup tube may be adjusted.

9. The invention as defined in claim 8 further comprising:
   j. a flap pivoted in front of the air pickup tube, and
   k. a control cable attached to the flap.

10. The invention as defined in claim 8 further comprising
    j. the end of the vapor pickup within the air pickup tube being at a 45° angle with the opening pointed downstream.

11. The invention as defined in claim 8 in combination with a fuel varporizer comprising:
    j. a hot water compartment having means for flowing hot water therethrough,
    k. a vapor compartment next to the hot water compartment having means for maintaining a liquid fuel pool therein,
    m. a mixture compartment,
    n. a vapor conduit connecting the vapor compartment to the mixture compartment,
    o. fan means on the vaporizer for blowing air into the mixture compartment and into the vapor compartment, and
    p. a conduit connecting the mixture compartment to said vapor pickup on the carburetor.

* * * * *